Oct. 5, 1948.  G. E. MERRITT  2,450,839
INTERFEROMETRIC COMPARATOR
Filed Aug. 16, 1944  6 Sheets-Sheet 1

Witness:
Burr W. Jones

INVENTOR.
George E. Merritt
BY
Clinton L. Janes
ATTORNEY

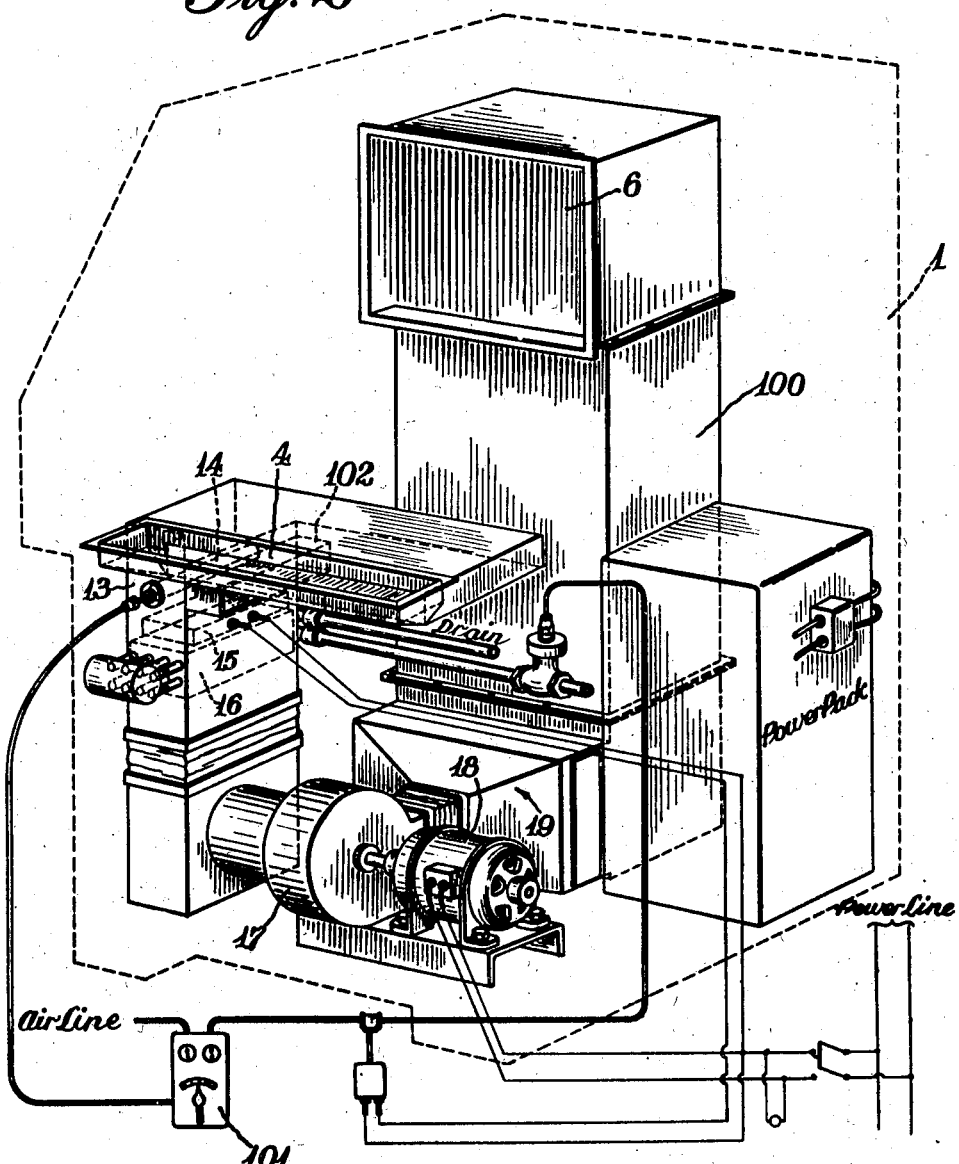

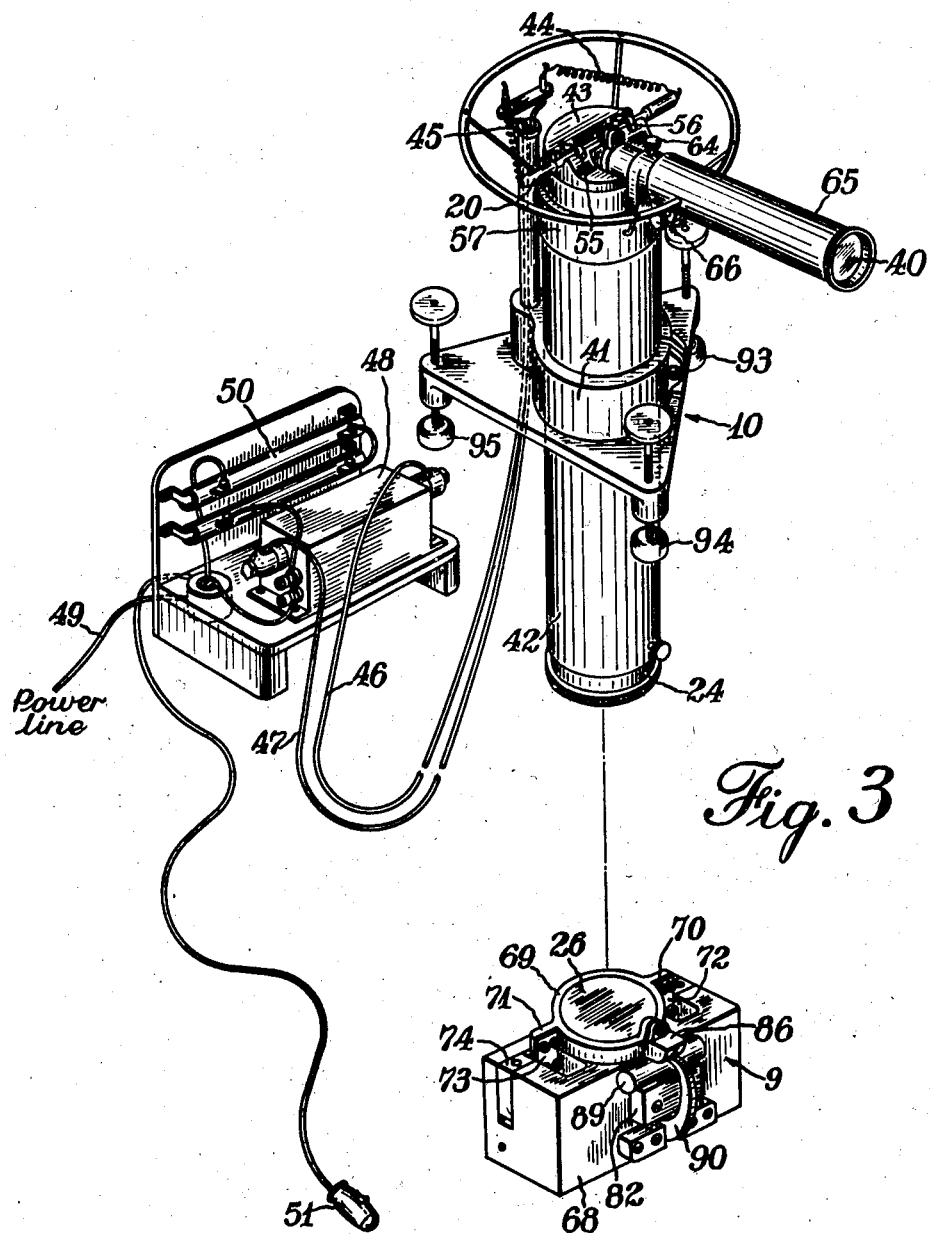

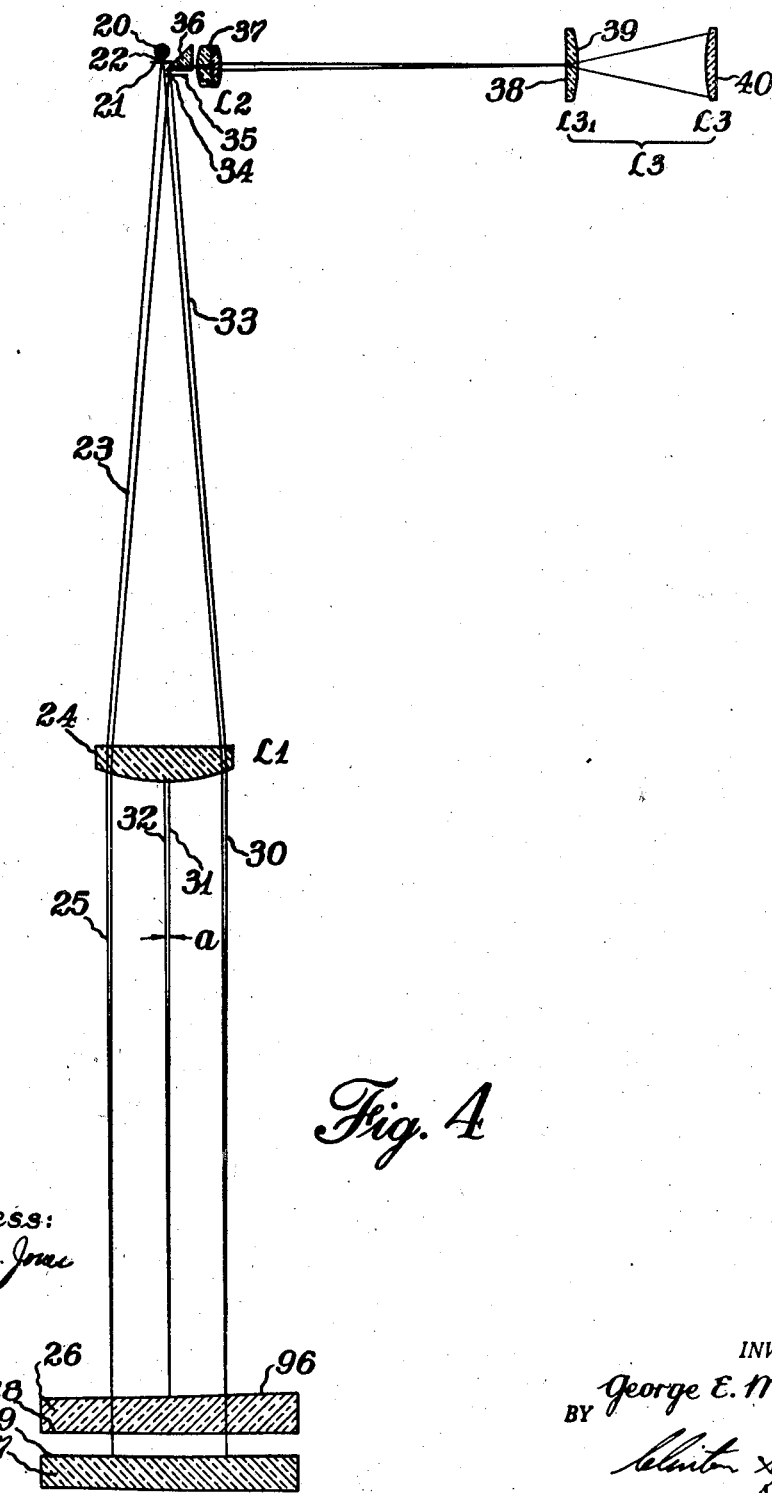

Oct. 5, 1948. G. E. MERRITT 2,450,839
INTERFEROMETRIC COMPARATOR
Filed Aug. 16, 1944 6 Sheets-Sheet 5
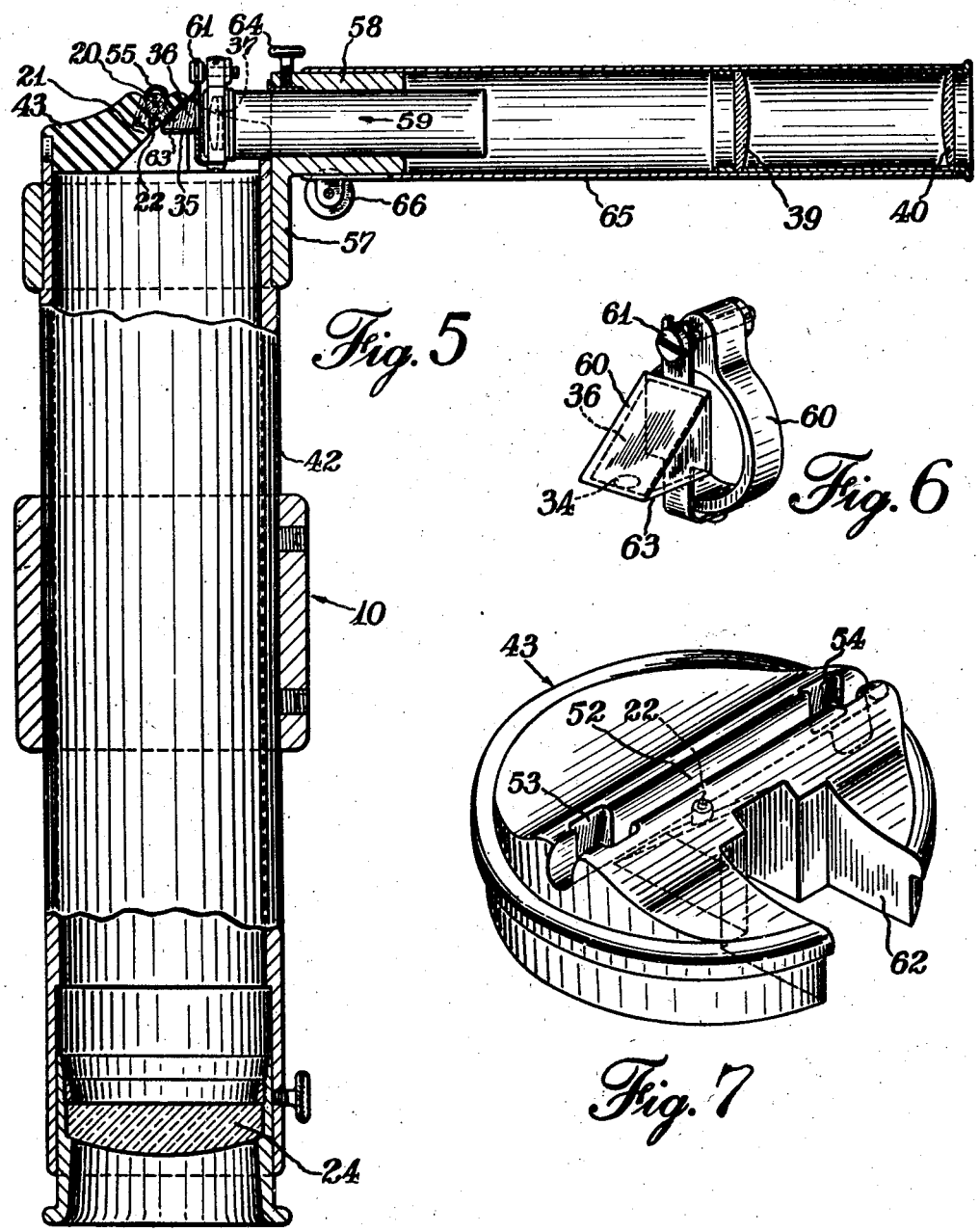
INVENTOR
George E. Merritt
BY Clinton S. James
ATTORNEY
Witness:
Burr W. Jones Oct. 5, 1948. G. E. MERRITT 2,450,839
INTERFEROMETRIC COMPARATOR
Filed Aug. 16, 1944 6 Sheets-Sheet 6
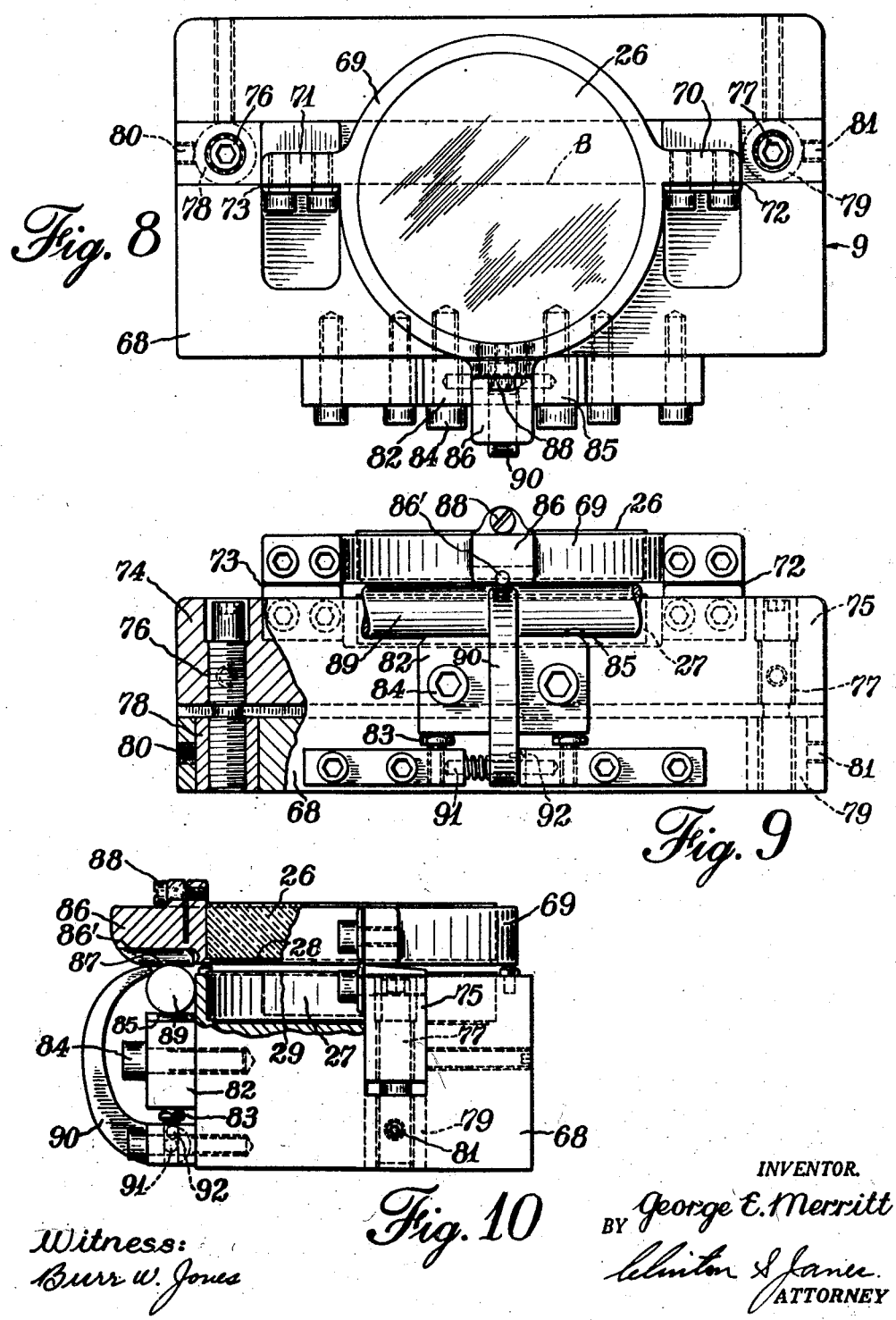

Patented Oct. 5, 1948

2,450,839

UNITED STATES PATENT OFFICE 2,450,839

INTERFEROMETRIC COMPARATOR

George E. Merritt, Elmira, N. Y., assignor to Bendix Aviation Corporation, South Bend, Ind., a corporation of Delaware Application August 16, 1944, Serial No. 549,709

11 Claims. (Cl. 33—143)

The present invention relates to an interferometric comparator and more particularly to an apparatus for comparing linear dimensions of parts by observation of interference fringes formed by reflections of portions of a light beam from two nearly parallel plane surfaces.

Interferometric gauges have heretofore been developed and have achieved some acceptance as laboratory instruments but their advantages in respect to fine discrimination have been offset by their bulkiness, susceptibility to disorders and difficulty of adjustment, to such an extent as to prevent their adoption as production tools. Moreover the fact that such devices have usually been limited by their structure to the measurement of small dimensions in the order of about 5 mm., has restricted their field of utility.

It is an object of the present invention to provide a novel interferometric gauge which is adapted for efficient and convenient use as a production tool.

It is another object to provide such a device which is capable of measuring dimensions as great as 15 mm. or more.

It is another object to provide such a device in which the optical flats which produce the fringes are readily accessible for cleaning but are at all times protected from contact with the work or any extraneous article.

It is a further object to provide such a device in which the dimension to be measured may vary quite widely from the separation of the optical flats.

It is another object to provide such a device in which the various optical elements are readily adjustable and the adjustment is accurately maintained.

It is another object to provide such a device in which one of the optical flats is mounted with provision for coarse adjustment to approximate desired location, and a fine adjustment for final positioning and securing the desired character of interference fringes.

It is another object to provide such a device in which the angle between the direct light beam and the light reflected from the optical flats is very small, whereby the resultant interference fringes are well defined even when the reflecting surfaces are separated by distances in the order of 15 mm. or more.

It is another object to provide such a device in which the source of light is so mounted as to be readily removable while being protected from mechanical injury and from overheating.

It is a further object to provide in combination with such a device a constant temperature cabinet therefor which provides an accurately controlled atmosphere free from suspended matter while permitting access to the device for adjustment and for the introduction and removal of the parts to be gauged.

Further objects and advantages will be apparent from the following description taken in connection with the accompanying drawing, in which:

Fig. 2 is a semi-diagrammatic view in perspective of the air-conditioning system for the cabinet;

Fig. 3 is a perspective view of the comparator and viewing instrument removed from its cabinet;

Fig. 4 is a diagrammatic representation of the optical system of the comparator;

Fig. 5 is an enlarged detail partly broken away and in section showing the light source and the condensing and viewing lens systems;

Fig. 6 is an enlarged detail in perspective showing an adjustable mount for the prism;

Fig. 7 is an enlarged detail in perspective of the cap and light source holder;

Fig. 8 is a top plan view of the work holder and mount for the optical flats;

Fig. 9 is a front elevation thereof partly broken away to show the adjusting means, and Fig. 10 is an end view of the same.

Figure 1:
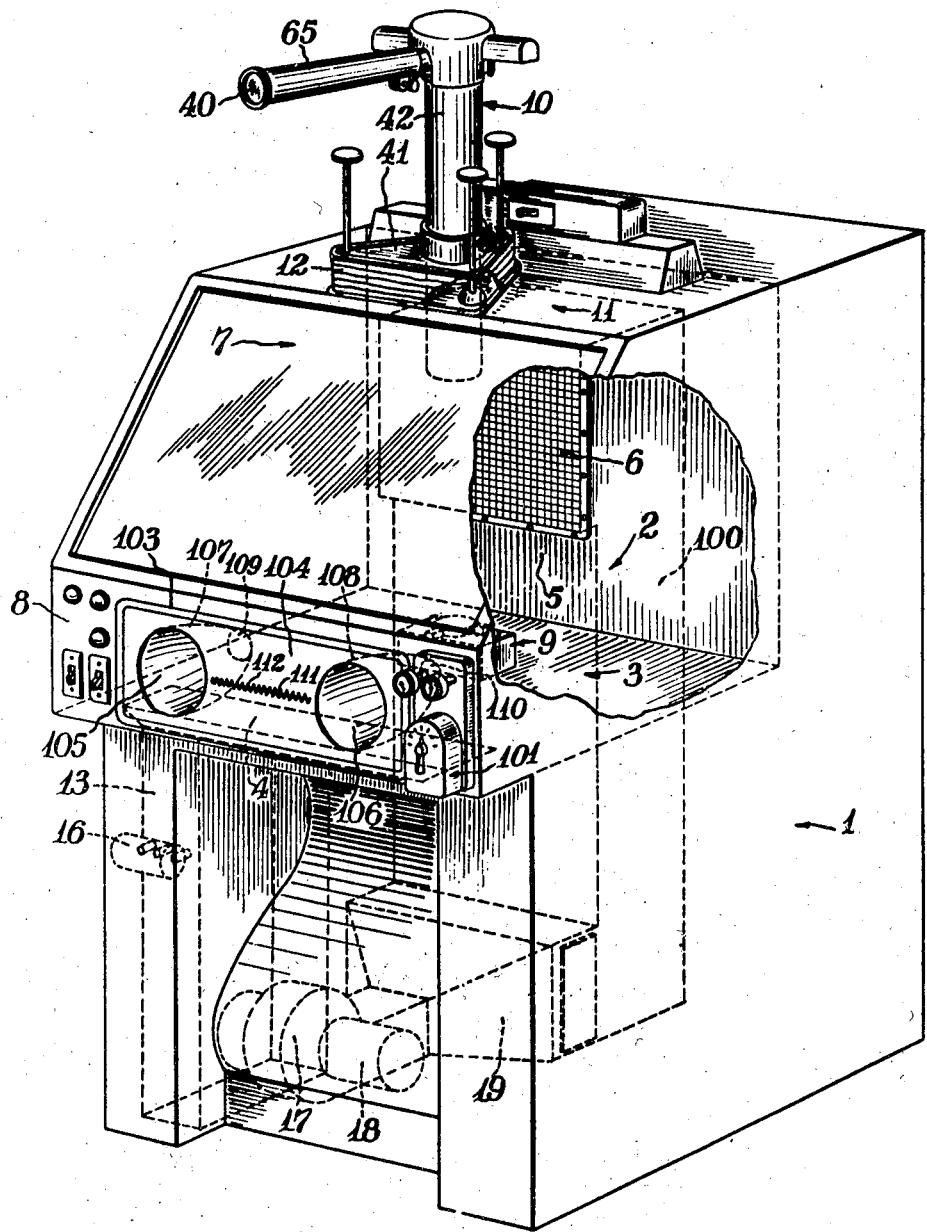
Fig. 1 is a perspective view of a preferred embodiment of the invention as set up in its air conditioned cabinet.

In Fig. 1 of the drawing there is illustrated a cabinet comprising a heavy rigid heat insulated frame 1 providing a chamber 2 to be air-conditioned. The chamber has a floor 3 with a grilled air outlet 4, a back wall 5 having air inlet 6, a front window 7 of suitable material such as plate glass and a front panel 8 on which the various controls and instruments are mounted and which has provision for access to the interior of the chamber while preventing air leakage.

The work holding part 9 of the interferometric gauge rests on the floor 3 of the chamber 2, while the light source and the observing lens system indicated generally by numeral 10 is mounted on the top 11 of the chamber, projecting through the top and having a flexible air sealing connection 12 therewith.

According to the present invention means are provided for maintaining a constant temperature within the chamber 2 and for removing suspended matter from the air in said chamber. As best shown in Fig. 2, this is accomplished by providing a duct 13 leading downward from the air outlet opening 4 in the floor 3 of the chamber, which duct contains a sensitive thermostat 14, an electrical heating grid 15, and a cooling coil 16. A blower 17 operated by a motor 18 draws the air from the duct 13 and forces the air through a cleaning system comprising a filter chamber 19 and an electro-static precipitator 100, the discharge from which enters the upper portion of chamber 2 through the opening 6.

The temperature control is regulated by means of a manual adjustment 101 mounted on the front panel 8 whereby the thermostat 14 may control energization of the heating grid 15 or admission of cold water to the cooling coil 16 as required to maintain the desired temperature. Inasmuch as the temperature control units and the air cleaning devices do not in themselves constitute a part of the present invention further description thereof is deemed unnecessary.

An inlet 102 is provided for admitting outside air into the system, and the operation of the blower 17 is so controlled as to maintain a slight positive air-pressure in the chamber 2 so that any leakage would be in an outward direction thus preventing contamination of the air within the chamber.

In order to permit manipulation of the gauge while preventing escape of air from the cabinet, the panel 8 is provided with an opening 103 which is closed by a suitable flexible septum 104 having arm holes 105, 106 therein which arm holes are closed by sleeves 107, 108 with elastic self puckering wrist bands 109, 110 adapted to fit closely around the wrists of the operator. In order to permit the entry and removal of articles from the chamber, the septum 104 is slit as shown at 111, the slit being closed by a slide fastener 112.

The salient features of the optical system involved in the present invention are illustrated diagrammatically in Fig. 4. As there shown a source 20 of monochromatic light such as a tube containing helium excited to luminescence by passage of electricity therethrough is mounted closely adjacent a diaphragm 21 having an aperture 22 of small diameter. The cone 23 of light traversing this aperture from the light source is directed upon the convergent lens 24 which is located at its focal distance from the light source whereby the cone of light is converted into a beam 25 of parallel rays.

A pair of optical flats 26 and 27 are arranged in the path of the parallel beam 25 with their adjacent surfaces 28 and 29 substantially parallel and almost but not quite normal to said beam whereby light is reflected back from said surfaces 28, 29 in a beam 30, the axis 31 of which makes a very small angle (A) with the axis 32 of the original beam. The lens 24 is preferably designed to have a long focal length in order to make the angle (A) small. In practice a focal length of 15 inches has been found to be satisfactory. The reflected beam is converged by the lens 24 into a cone 33, the upper end of which passes through a small opening 34 in a diaphragm 35 closely adjacent the opening 22 in diaphragm 21.

A prism 36 is located just above the opening 34 in such position that the apex of the cone 33 strikes the prism close to its lower edge. The light so reflected emerges laterally through a lens 37 which is arranged to superimpose the reflections from the two surfaces 28, 29 of the optical flats substantially in the plane 38. Means for observing the pattern so formed is provided in the form of an eye piece comprising a pair of lenses 39, 40.

In Fig. 3 there is shown a preferred form of instrument embodying the optical arrangement above described. As there shown, a rigid tripod frame 41 is arranged to support a vertical tubular holder 42, the upper end of which carries a cap 43 supporting the light source 20, and the lower end of which has adjustably fixed therein the condensing lens 24.

The light source 20 is energized through flexible leads 44 and 45 and cables 46 and 47 from a suitable source 48 of high voltage such as a step-up transformer. As here shown the transformer is energized from the power line 49 through a variable resistance unit 50 under the control of a manual switch 51.

The cap 43, as best shown in Fig. 7, is provided with a groove 52 for receiving the light source, having enlargements 53 and 54 formed to receive and cooperate with clips 55 and 56 which retain the light source in position but are readily flexed to permit removal thereof. The bottom of the cap 43 is closed in order to form the diaphragm 21 which is light-tight except for the opening 22 formed directly below the light source 20 so as to permit the light therefrom to be projected downwardly within the tube 42.

The observing lens system (Fig. 5) is mounted on a bracket 57 fixed on the upper end of the tube 42 and having a cylindrical bearing 58 within which a lens tube 59 is slidably and rotatably mounted. The prism 36 is mounted in a holder 60 fixed on the inner end of the tube 59, flexible mounting means 61 being provided for enabling angular adjustment of the prism. The projection lens 37 is suitably mounted in the end of the tube 59 adjacent the prism 36.

The cap 43 is provided with a recess 62 as best shown in Fig. 7 which permits the prism 36 to be moved into close proximity to the light opening 22. Preferably this recess is arranged to permit the prism to be advanced until its lower edge 63 may partially intercept the cone of light emerging from said light opening so as to allow the angle (A) between the direct and the reflected beam to be made very small. Thus in one preferred embodiment of the invention the openings 22 and 34 are each one-sixteenth of an inch in diameter, and the focal length of the lens 24 is sixteen inches. When the instrument is arranged to make the openings 22 and 34 tangent to each other, this makes the angle A have a value of about three minutes thirty-eight seconds. Adjustment of the tube 59 is locked by suitable means such as a thumb screw 64.

A telescopic tube 65 is slidably mounted on the outside of the cylindrical bearing 58 and carries in its outer end the eye piece comprising the viewing lenses 39, 40. Adjustment of the tube 65 for focusing purposes is permitted by sliding the tube on the bearing 58, the adjustment being locked by the clamping means 66.

As shown in Fig. 3, the work holder and mounting means 9 for the optical flats rests on the floor 3 of the cabinet 2 directly below the optical system 10 but entirely disconnected therefrom. This element comprises a base 68 on which is fixedly mounted the lower optical flat 27 in a substantially horizontal position. The upper optical flat 26 is fixed in a mounting ring 69 having radially extending arms 70, 71 to which are rigidly attached the upper ends of flexible hinge members 72, 73.

The lower ends of the hinge members are fixed to anchorages 74, 75 which are vertically adjustable by differentially threaded micrometric screws 76, 77. Coarse adjustment of the hinge mounts is provided by means of threaded bushings 78, 79 receiving the lower ends of the screws 76, 77, and held in adjusted position by set screws 80, 81, while fine adjustment is secured by subsequent rotation of the screws 76, 77.

An abutment forming one jaw of the comparator gauge is provided by a block 82 fixed on the front of the base 68 with adjusting means 83 and clamping means 84. The upper surface 85 of the abutment 82 is flat and parallel with the upper surface 29 of the lower optical flat 27.

The upper jaw of the gauge is formed by an abutment 86 which is formed as a projection from the mounting ring 69 for the upper optical flat 26. The lower surface 87 of the abutment 86 is also flat and substantially horizontal when the ring 69 is horizontal but may be tilted slightly by means of the adjustment 88. A cylindrical hardened contact member 86' is preferably mounted in the jaw 86 radially to the flat 26 and projecting slightly beyond the surface 87, so as to provide a point contact with a cylindrical work piece inserted between the jaws of the gauge. Means for holding the work 89 between the abutment jaws 82 and 86 is provided in the form of an arm 90 pivoted at 91 to the base 68 and having a spring pressed detent 92 which serves to hold the arm in yielding engagement with the work as best shown in Fig. 10.

The axis of tilt B, defined by the hinge members 72, 73 is slightly offset from the center of the ring 69 as best shown in Fig. 8 whereby the weight of the ring is used to tilt it in a direction to close the gauge jaws 82, 86.

The tripod 41 is provided with feet 93, 94 and 95 which are adjustable to vary the angle of incidence of the light beam 25 on the optical flats. In this manner the reflected beam may be directed through the opening 34 onto the prism 36 as described.

The upper flat 26 is preferably made slightly wedge-shaped so that the light reflected from its upper surface 96 will be deflected laterally sufficiently to avoid interference with the light reflected from its lower surface 28.

In operation, assuming that the work to be gauged has remained in the cabinet a sufficient time to have reached the stabilized temperature, a standard gauge block is inserted between the abutments 82 and 86 of the comparator. The instrument, and in particular said abutments, are then adjusted to secure a suitable interference pattern as observed through the telescopic eyepiece 39, 40. This interference pattern is formed by the difference in phase of the light waves reflected from the two surfaces 28, 29 of the optical flats and superimposed in the field of view of the eye-piece by the projection lens 37. If the surfaces 28, 29 are exactly parallel there will be no interference fringes, but deviations from such parallelism cause alternate reinforcements and cancellations of the reflected light waves in accordance with their phase relation. An increase in the angle between the two flat surfaces 28, 29 accordingly increases the number of fringes in the field of view.

After the instrument has been adjusted so as to show a suitable small number of fringes in the field of view with the standard gauge block in the instrument, the gauge block is removed and the article 89 which it is desired to compare therewith is inserted in its place. If the diameter of this article is not the same as that of the gauge block, the upper optical flat 26 will be correspondingly tilted with respect to the lower flat so that the angle between the surfaces 28, 29 will be changed. This change in angle will be signalized by a corresponding change in the number of fringes observed in the eye-piece of the instrument, which change may form the basis for an empirical calculation of the variation of the article from standard dimension.

Although certain structure has been illustrated and described in detail, it will be understood that other embodiments of the invention are possible and that various changes may be made in the design and arrangement of the parts illustrated without departing from the spirit of the invention as defined in the claims appended hereto.

What is claimed is:

1. An interferometric gauge comprising a pair of relatively movable optical flats, means for determining the relative position of the flats in accordance with the critical dimension of the article to be gauged, means including said flats forming an optical interference pattern which is controlled by the relative position of the flats, means for viewing said pattern including a telescope, a cabinet housing the gauge and providing a fixed mount therefor, universally adjustable means for mounting the telescope on the exterior of the cabinet, flexible sealing means for preventing leakage of air from the cabinet, and air-conditioning means for the cabinet including means for supplying clean air at a constant temperature to the cabinet and for maintaining a pressure therein above the outside atmosphere so as to prevent invasion of unconditioned air by leakage into the cabinet.

2. In combination with an apparatus as set forth in claim 1, means for opposing the escape of air from the cabinet while permitting manipulation of the gauge therein.

3. An interferometric gauge as set forth in claim 1 in which the air-conditioning means comprises a circulatory system including temperature controlling means, circulating means, a mechanical filter and an electro-static precipitator, the system being arranged to withdraw air from in front of and beneath the gauge and supply conditioned air above and in the rear of the gauge to cause the conditioned air to flow over and around the gauge.

4. In an interferometric comparator a source of monochromatic light, a condensing lens forming a beam of parallel rays from said light source, a light transmitting optical flat which is slightly wedge-shaped in cross-section, arranged in the path of said beam with its emergent surface substantially normal thereto, a second optical flat located in the path of said beam spaced in substantially parallel relation to said emergent surface, said light transmitting optical flat being disposed between said light source and the second optical flat, whereby light reflected from the substantially parallel surfaces forms an interference pattern; a tilting mount for one of said flats including a pair of flexible plates rigidly affixed to the flats in alignment to form a spring hinge, gauge jaw members rigidly connected to the flats laterally with respect to the hinge, whereby introduction of an element to be gauged between said jaw members causes relative angular displacement of the flats, the axis of said hinge being slightly offset from the center line of the flats in a direction away from the gauge jaws, optical means for observing the interference pattern caused by said displacement, and means for mounting said observing means with provisions for universal adjustment with respect to the optical flats.

5. An interferometric comparator as set forth in claim 4 including further micrometric means for adjusting said jaw members perpendicularly to the flats so as to enable elements of various sizes to be gauged without causing relative movement of the flats to such an extent as to lose the interference pattern.

6. An interferometric comparator as set forth in claim 4 which includes a prism having one edge closely adjacent the light source whereby said condensing lens converges the reflected beams of light upon the prism near said edge.

7. An interferometric comparator as set forth in claim 4 in which one of said jaw members is mounted for angular adjustment about an axis parallel to said hinge axis whereby the surfaces of the jaw members may be brought into parallelism.

8. In combination, a cabinet including a chamber having a flat floor, means for maintaining the chamber at a constant temperature, an interferometric comparator comprising a light source, optical projecting and viewing systems, a tripod frame supporting said light source and optical systems on the exterior of the cabinet, a pair of optical flats, means for supporting the flats independently of said tripod frame in substantially parallel relation on the floor within the chamber in the beam of light projected from the light source, means for adjusting the tripod frame with respect to the cabinet to thereby adjust the angle of incidence of said beam on the optical flats, and flexible closure means attached to the tripod frame and the wall of the cabinet for preventing the escape of air from the chamber without interfering with the adjustment of the tripod frame.

9. An apparatus as set forth in claim 8 in which the viewing system includes a telescope, said apparatus also comprising means for removing suspended matter from the air in the cabinet and for building up a positive air pressure therein.

10. In an interferometric gauge a stationary optical flat, a movable flat, means for supporting the movable flat in substantially parallel relation to the stationary flat including a pair of aligned flexible hinge plates fixed to one of the flats and adjustably anchored to the other flat, a gauge jaw fixed to the stationary flat having a plane surface parallel to the surface of the stationary flat, and a movable gauge jaw attached to the movable flat having a cylindrical surface, the axis of which is parallel to the surface of the movable flat and normal to the plane of the hinge plates.

11. An interferometric gauge as set forth in claim 10 in which said fixed gauge jaw has an abutment surface parallel to the axis of the hinge and substantially perpendicular to the plane surface of the jaw to position a part to be measured in the jaws, and a spring actuated member arranged to hold said part in engagement with the abutment surface with a substantially uniform pressure.

GEORGE E. MERRITT.

REFERENCES CITED

The following references are of record in the file of this patent:

UNITED STATES PATENTS

| Number | Name | Date |
| --- | --- | --- |
| 1,901,632 | Chamberlain | Mar. 14, 1933 |
| 2,286,621 | Hurley | June 16, 1942 |
| 2,312,888 | Everest | Mar. 2, 1943 |

FOREIGN PATENTS

| Number | Country | Date |
| --- | --- | --- |
| 239,120 | Germany | Oct. 10, 1911 |

OTHER REFERENCES

"A New Interferential Dilatometer," by I. G. Priest; Bureau of Standards Scientific Paper No. 365; pub. 1920; pp. 669 to 678 and plate facing page 674 cited. (Copy in Div. 7, U. S. Pat. Off.)

"Interference Methods for Standardizing and Testing Precision Gage Blocks," by C. G. Peters et al.; Bureau of Standards Scientific Paper No. 436; pub. 1922; p. 685 cited. (Copy in Div. 7, U. S. Pat. Off.)